United States Patent

[11] 3,547,481

| [72] | Inventor | George H. Gleason |
| | | 2814 Berry Lane, Independence, Mo. 63057 |
| [21] | Appl. No. | 756,656 |
| [22] | Filed | Aug. 30, 1968 |
| [45] | Patented | Dec. 15, 1970 |

[54] SECTIONAL CAMPER
9 Claims, 7 Drawing Figs.

[52] U.S. Cl. ................................................. 296/23
[51] Int. Cl. ..................................................... B60p 3/34
[50] Field of Search ............................................ 296/23, 23MC; 52/(Inquired)

[56] References Cited
UNITED STATES PATENTS

| 3,321,233 | 5/1967 | Davis | 296/23MC |
| 3,290,084 | 12/1966 | McPherson | 296/23MC |
| 2,879,103 | 3/1959 | Hall. | |

*Primary Examiner*—Philip Goodman
*Attorney*—Schmidt, Johnson, Hovey, Williams & Chase ABSTRACT: A sectional camper for use with a pickup truck having a load-carrying bed, there being an open-top lower section normally in said bed resting on its deck and an open-bottom upper section normally mounted on top of the lower section. The upper section is adapted for alternatively mounting it directly above the bed as a cover for the bed upon removal of the lower section.

PATENTED DEC 15 1970
3,547,481
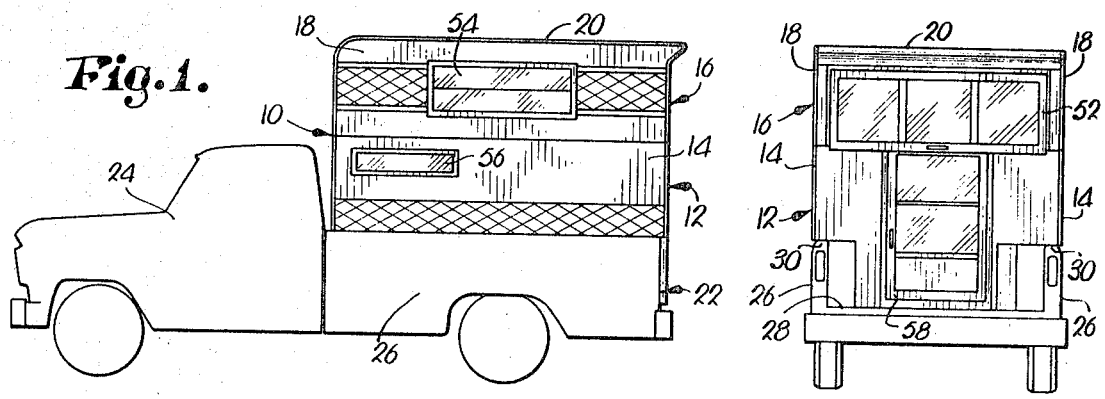
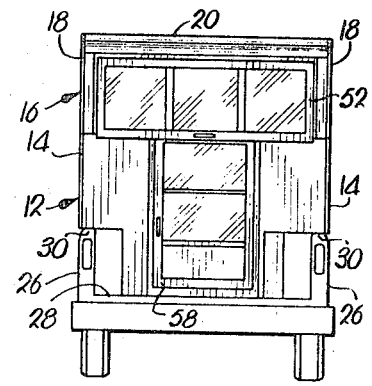
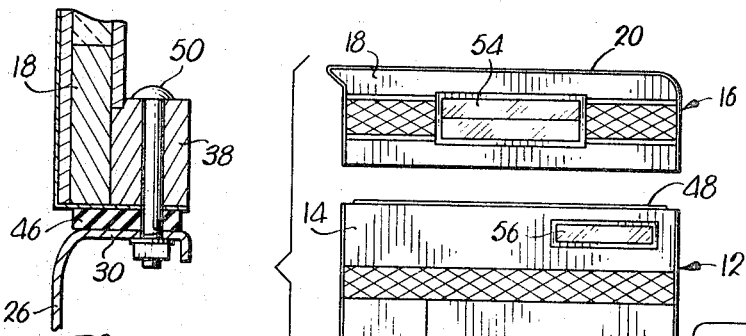
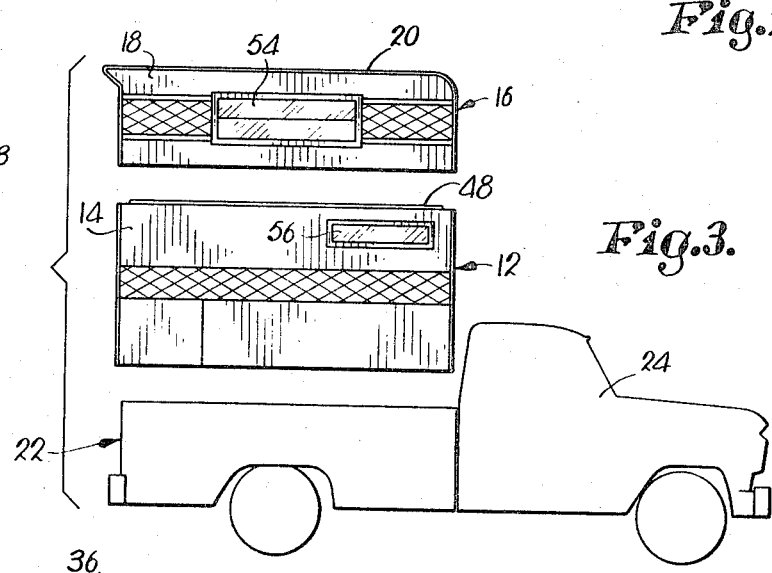
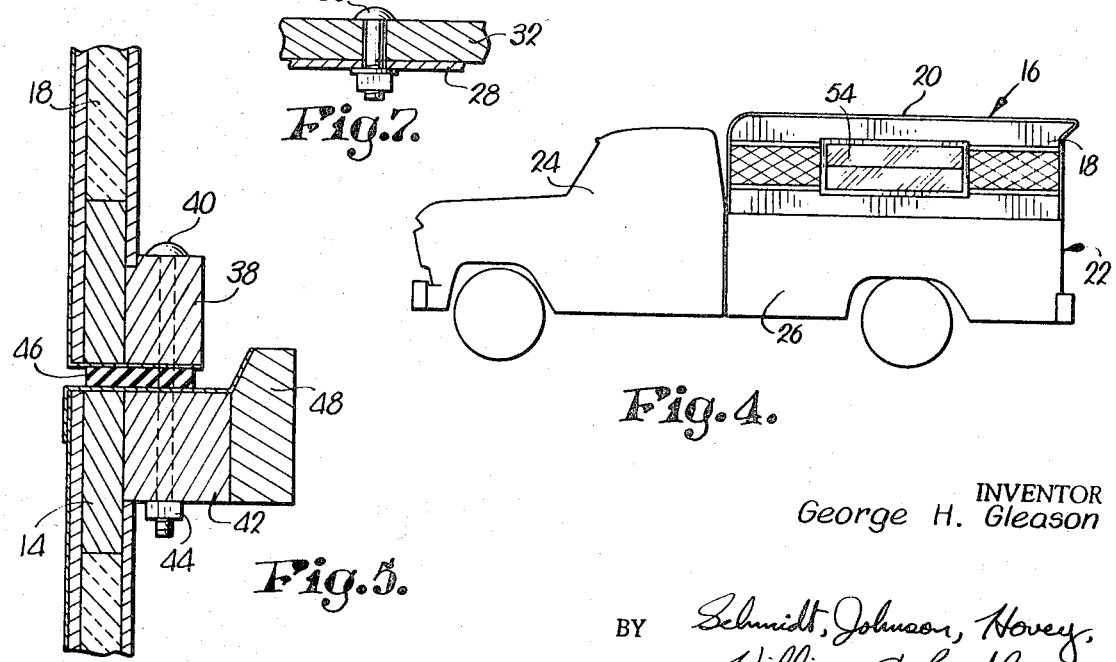
INVENTOR
George H. Gleason
BY Schmidt, Johnson, Hovey,
Williams & Bradley.
ATTORNEYS.

SECTIONAL CAMPER

This invention relates to camping and utility units in combination with the load-carrying bed of a pickup truck.

Most campers used in conjunction with pickup trucks have a single, enclosed unit which is placed on the truck for camping and later removed for everyday use of the truck. In order to protect cargo, tools or the like from the elements after the camper unit has been removed, a separate cover must be provided; i.e. in order to have both a cover section over the pickup's cargo bed for protection during everyday use and a camping unit to mount in the bed at other times, two complete units must be purchased.

It is, therefore, an important object of my present invention to provide a sectional camper unit which eliminates the expense of two separately operable bed-mounting units in order to satisfy the conditions described above.

It is another important object of the instant invention to provide a sectional camper which utilizes the protection properties of the cover section in both camping and everyday use by having an open-top bottom section adapted for removably receiving the cover section, the two sections being received as a unit by the bed of a pickup truck for camping purposes and the cover section being mounted alone on the bed for everyday use.

In the drawing:

FIG. 1 is a side elevational view of a combination sectional camper and pickup truck made pursuant to my present invention;

FIG. 2 is a rear elevational view thereof;

FIG. 3 is an exploded view showing the opposite side thereof;

FIG. 4 is a side elevational view showing the upper camper section mounted on the truck;

FIG. 5 is an enlarged, fragmentary, cross-sectional view showing a sidewall of the upper section coupled to a side plate of the truck bed; and FIG. 7 is an enlarged, fragmentary, cross-sectional view of the floor of the lower section connected to the deck of the truck bed.

Sectional camper 10 includes an open-top lower section 12 having spaced, interconnected side panels 14, and an open-bottom upper section 16 provided with spaced sidewalls 18 having a roof 20 interconnecting the walls 18. The lower section 12 is adapted for disposition within a bed 22 of a pickup truck 24, and upper section 16 normally overlies the lower section 12 with its walls 18 resting on panels 14.

The bed 22 has a pair of spaced side plates 26 extending upwardly from a deck 28, the plates 26 having inturned flanges 30 at their upper edges which, along with deck 28, support the lower section 12 when the camper 10 is mounted on bed 22 as shown in FIGS. 1 and 2. In this condition floor 32 of lower section 12 is secured to deck 28 by a series of bolt and nut assemblies 36 as shown in FIG. 7.

The upper section 16 is joined with the lower section 12 as shown in FIG. 5, wherein longitudinal bars 38 extending around the lower inside edges of walls 18 receive bolts 40 additionally passing through longitudinal strips 42 extending around the upper inside edges of panels 14, with nuts 44 tightening against the bottom surfaces of the strips 42. Bolts 40 also pass through elongated gaskets 46 which are clamped between bars 38 and strips 42 to provide weathertight seals for the living quarters inside the camper 10. Due to condensation, however, some moisture will form along the joint of upper section 16 and lower section 12; therefore, an elongated ridge 48 is affixed to strip 42 projecting upwardly therefrom and extending therearound, thus acting as a barrier to the moisture.

When it is desired to use the truck 24 for everyday use, upper section 16 may be used as a roof for bed 22 by removing the camper 10 from bed 33, disassembling bolts 40 and nuts 44, and replacing section 16 along with gaskets 46 on the flanges 30. Bolt and nut assemblies 50 are then used to secure section 16 to bed 22 through bars 38, thus presenting a weathertight shield over goods or equipment being carried by the truck 24.

Section 16 has an elongated rear window 52 which is hinged at the top for opening outwardly, and a pair of ventilation windows 54, positioned on each side of section 16, which slide open to permit fresh air to circulate through the camper 10. The lower section 12 is provided with a pair of small windows 56 on each of the side panels 14 to aid in air circulation, and a door 58 at the rear of section 12 which is swingable to the outside to permit access to the inside of the camper 10.

When both the lower section 12 and the upper section 16 are mounted on the truck 24 as a complete unit, the space for window 52 is in communication with the door 58; therefore, movement in and out of the camper 10 may be eased by bracing window 52 in the open position to reveal more headroom as door 58 is opened to permit entrance and exit. Door 58 may be opened without first opening window 52 if the extra headroom is not necessary.

When section 16 is mounted alone on truck 24 as a protective cover for the cargo bed 22, access to that area is gained by opening window 52. Large items may be loaded and stored in bed 22 by also lowering the tailgate of the truck (not shown), thereby providing a larger opening.

It can be easily seen that with my invention the services of two operable units are acquired although the expense of only one unit, an enclosed camper, is necessary. To obtain the utility of my invention with campers and cover sections currently on the market, additional expense is required.

I claim:

1. In combination with a pickup truck having a load-carrying bed, said bed including a deck and a pair of spaced side plates secured to and extending upwardly from said deck, a sectional camper comprising:

an open-top lower section having a pair of spaced, interconnected side panels;

said section being normally disposed within the bed between said plates resting on said deck;

an open-bottom upper section having a pair of spaced sidewalls and a roof interconnecting said walls, said upper section normally overlying the lower section with its walls resting on said panels;

connectors releasably attaching the lower section to said bed;

fasteners releasably interconnecting the sections, said upper section being adapted for mounting on said bed with its walls resting on said plates upon release of the connectors and the fasteners and removal of the lower section; and couplers for attaching the upper section to the bed when the upper section is mounted thereon, said panels having longitudinal strips secured thereto at their uppermost edges, said walls having longitudinal bars secured thereto at their lowermost edges and normally overlying the strips, said fasteners normally joining the bars and the strips.

2. The invention of claim 1, said lower section having a floor interconnecting the panels and normally resting on said deck, said connectors joining the floor and the deck.

3. The invention of claim 1, said couplers joining the bars and the plates when the upper section is mounted on the bed.

4. The invention of claim 1, the bars and the strips being on the inner faces of the walls and panels respectively; and barrier means on said strips for outward deflection of moisture tending to collect between the proximal edges of the walls and the panels.

5. The invention of claim 1; and gaskets clamped between the bars and the strips by said fasteners presenting weathertight seals.

6. The invention of claim 5, said plates having inturned flanges, said couplers clamping the gaskets between the bars and the flanges when the upper section is mounted on the bed.

7. The invention of claim 6, the bars and the strips being on the inner faces of the walls and panels respectively; and barrier means on said strips for outward deflection of moisture tending to collect between the proximal edges of the walls and the panels.

8. The invention of claim 7, said lower section having a floor interconnecting the panels and normally resting on said deck, said connectors joining the floor and the deck.

9. In combination with a mobile vehicle having a load-carrying bed, said bed including a deck and a pair of spaced side plates secured to and extending upwardly from said deck, a sectional camper comprising:

an open-top lower section having a pair of spaced, interconnected side panels;

said section being normally disposed within the bed resting on said deck between the plates;

an open-bottom upper section having a pair of spaced sidewalls and a roof interconnecting said walls, said upper section normally overlying the lower section with its walls resting on said panels; and means releasably interconnecting the walls and the panels, said upper section being adapted for mounting the latter on said bed with its walls resting on and secured to said plates when the interconnecting means is released and the lower section removed whereby to present a protected cargo area defined by the walls, the plates, the roof and the deck.